United States Patent
Yang et al.

(10) Patent No.: US 9,785,306 B2
(45) Date of Patent: Oct. 10, 2017

(54) APPARATUS AND METHOD FOR DESIGNING DISPLAY FOR USER INTERACTION

(71) Applicant: ELECTRONICS AND TELECOMMUNICATIONS RESEARCH INSTITUTE, Daejeon (KR)

(72) Inventors: Ungyeon Yang, Daejeon (KR); Seongwon Ryu, Daejeon (KR); Gilhaeng Lee, Seoul (KR); Kihong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 433 days.

(21) Appl. No.: 14/341,898

(22) Filed: Jul. 28, 2014

(65) Prior Publication Data
US 2015/0061998 A1  Mar. 5, 2015

(30) Foreign Application Priority Data
Sep. 3, 2013  (KR) .......................... 10-2013-0105329

(51) Int. Cl.
*G09G 5/00* (2006.01)
*G06F 3/0481* (2013.01)
(Continued)

(52) U.S. Cl.
CPC ....... *G06F 3/04815* (2013.01); *G02B 27/017* (2013.01); *G02B 27/225* (2013.01);
(Continued)

(58) Field of Classification Search
CPC ...... G06F 3/04815; G06F 3/011; G06F 3/013; G02B 27/017; G02B 27/22
(Continued)

(56) References Cited

U.S. PATENT DOCUMENTS

2008/0024597 A1    1/2008  Yang et al.
2011/0029903 A1*   2/2011  Schooleman .......... G06F 3/011
                                                        715/764
(Continued)

FOREIGN PATENT DOCUMENTS

KR    10-2008-0010502 A    1/2008

*Primary Examiner* — Michael Pervan
*Assistant Examiner* — Andrew Lee
(74) *Attorney, Agent, or Firm* — Rabin & Berdo, P.C.

(57) ABSTRACT

The present invention relates to an apparatus and method for designing a display for user interaction. The proposed apparatus includes an input unit for receiving physical information of a user and a condition depending on a working environment. A space selection unit selects an optimal near-body work space corresponding to the condition received by the input unit. A space search unit calculates an overlapping area between a viewing frustum space, defined by a relationship between a gaze of the user and an optical system of a display enabling a 3D image to be displayed, and the optimal near-body work space selected by the space selection unit. A location selection unit selects a location of a virtual screen based on results of calculation. An optical system production unit produces an optical system in which the virtual screen is located at the location selected by the location selection unit.

13 Claims, 19 Drawing Sheets

(51) Int. Cl.
*G06F 3/01* (2006.01)
*G02B 27/01* (2006.01)
*G02B 27/22* (2006.01)

(52) U.S. Cl.
CPC .............. *G06F 3/011* (2013.01); *G06F 3/013* (2013.01); *G06F 3/017* (2013.01)

(58) Field of Classification Search
USPC .................................................. 345/6–8, 156
See application file for complete search history.

(56) References Cited

U.S. PATENT DOCUMENTS

| | | | |
|---|---|---|---|
| 2011/0149042 A1 | 6/2011 | Lee et al. | |
| 2011/0296353 A1* | 12/2011 | Ahmed .................... | G06F 3/017 715/848 |
| 2012/0299923 A1* | 11/2012 | Takahashi ............ | H04N 13/044 345/428 |
| 2013/0016193 A1* | 1/2013 | Nepveu ................ | G02B 27/017 348/51 |
| 2013/0095924 A1* | 4/2013 | Geisner .................. | A63F 13/00 463/32 |
| 2014/0372957 A1* | 12/2014 | Keane .................... | G06F 3/013 715/852 |

* cited by examiner (a)
(b)
(c)
(d)

APPARATUS AND METHOD FOR DESIGNING DISPLAY FOR USER INTERACTION

CROSS REFERENCE TO RELATED APPLICATION

This application claims the benefit of Korean Patent Application No. 10-2013-0105329, filed on Sep. 3, 2013, which is hereby incorporated by reference in its entirety into this application.

BACKGROUND OF THE INVENTION

1. Technical Field

The present invention relates generally to an apparatus and method for designing a display for user interaction and, more particularly, to an apparatus and method for designing a display for three-dimensional (3D) user interaction in a near-body space.

2. Description of the Related Art

A procedure in which human beings visually recognize an object as a three-dimensional (3D) stereoscopic image is influenced by a variety of visual factors.

Since human beings have two eyes on left and right sides of their faces, binocular disparity information occurs between images of external world that are observed, and such images are recognized as a single 3D stereoscopic image by the brain. The principle of the recognition of a 3D effect felt by such binocular disparity has been applied to popularized 3D stereoscopic display devices. A display device outputs images to be applied to both eyes of a user. The user may view 3D stereoscopic image content by wearing a device (for example, 3D stereoscopic eyeglasses) for separating left/right images corresponding to respective eyes.

As wearable displays, there are introduced a Head Mounted Display (HMD), a face Mounted Display (FMD), a Head-Up Display (HUD), a Near-Eye Display (NED), an Eye Glass Display (EGD), etc.

Such a wearable display denotes a device for presenting virtual information created by a computer to the organ of sight of a user. Wearable displays may be chiefly classified into see-closed schemes for separating the visual part of the user from an external space and see-through schemes for allowing the visual part and the external space to be simultaneously viewed.

Here, the see-through schemes are classified into low-class categories such as an optical see-through scheme for viewing an external space through transmissive/reflective optical modules and a vision-based see-through scheme for processing information via an image acquisition device such as a camera and presenting processed information to the user.

In the technical fields of virtual reality, augmented reality, and mixed reality, when experience in virtual content is transferred to the user, a wearable display has been utilized as a representative interface for presenting personalized immersive content.

Around the year 2010, with the popularization of Hollywood movies and home appliance markets for 3D TVs to which 3D visualization technology was applied, general consumer interest in 3D stereoscopic images has increased. However, it is impossible to completely (100%) reconstruct a natural phenomenon based on the visual recognition of a 3D stereoscopic space due to technical limitations. Reports on side effects from the utilization of related technology have increased, and research into the solution of related problems based on human factor-related issues has been conducted in the fields of research and industry.

Holographic display technology designated as an ideal 3D stereoscopic image visualization technology implements a procedure in which a light source or light from the light source is reflected and scattered from the surface of an object and is perceived by human eyes, as in the case of a natural environment, but there are still many limitations in the implementation of a commercialization level quality and the mass production of actual products.

Most of 3D stereoscopic image displays that may be currently commercialized represent a sense of depth of an object based on binocular disparity information. Even an auto-stereoscopic display (or glass-free display) which does not require the wearing of glasses basically represents a 3D effect using the principle of presenting binocular disparity images to both eyes.

A procedure in which a human being perceives a 3D stereoscopic image is influenced by a plurality of factors, but most 3D commercialized display devices are configured to merely realize a binocular disparity principle. However, a stereoscopic image does not reflect various parameters related to visualization such as the user's viewpoint information, thus representing an inaccurate 3D effect as a primary problem.

Since there is a fundamental problem such as a convergence-accommodation conflict, side effects may be applied to viewers upon representing images in which 3D stereoscopic objects are projected or retracted on a screen, by using stereoscopic image output technology based on binocular disparity.

The present applicant recognized that an optimal visualization space corresponding to a limited area (enabling safe viewing of users while minimizing side effects) is present, via research conducted over several years. However, continuous experience in most cases in which the latest research results are not desirably reflected/optimized causes human factor-related side effects. FIG. 1 is a diagram showing a convergence-accommodation conflict (VA conflict). Parallax denotes a difference between the horizontal positions of an image for a left eye 1 and an image for a right eye 1 projected on an image screen 3. FIG. 1 illustrates the case of positive parallax in which images are separated to allow a virtual 3D object 4 to be located behind the image screen 3, wherein a vergence distance and a focal distance must be identical to each other in a situation in which a human being normally perceives a sense of 3D distance. However, when positive or negative parallax is implemented, such characteristics cannot be satisfied.

Binocular disparity is a factor having a significant effect on the perception of a sense of distance of an object located in a near-body space (refers to a nearby reachable space which an observer can reach by moving his or her legs and arms without moving his or her location, and typically denotes a space within a radius of about 1 m to 1.5 m) among factors required by a human being to perceive a sense of a 3D stereoscopic space. Further, an existing binocular type HMD has a focal distance at which most images of objects are formed within a distance of 2 m to 3 m (an example of a promotional phrase of related products, "If you wear "OOO product," you can have the feeling of viewing a OO-inch large screen installed at a distance of 2 to 3 m").

Examples in which a 3D object (for example, a 3D User Interface: UI) around a user is manipulated using a glass-type or a wearable display are frequently produced in movies and product advertising. However, in order to directly interact (such as a touch) with objects within the range of a near-body space, a sense of positioning a 3D object at the fingertip of the user must be transferred, as shown in FIGS. 2A to 2D.

Because most 3D UIs introduced in movies, Commercial Film (CF), etc. are conceptual scenes in which images are combined and represented from the viewpoint of the third person, a user actually encountering the function cannot experience such a natural image. Therefore, there is required technology for visualizing images according to a sense of exact depth within a space defined by a distance of 1 to 2 m around a user's viewpoint via a wearable display.

However, an optical see-through-type wearable display is configured such that an optical module outputs an image at a location spaced at a predetermined distance in a space, and such that the image is always first viewed by the user's eyes. Accordingly, since an unnatural phenomenon occurs in which an image is always viewed to overlap with a virtual image in front of an actual object located closer to the eyes than the virtual image, technology for exactly representing a sense of relative depth must be applied to a wearable display.

At an early stage in which 3D visualization technology is popularized, consumers experiencing 3D stereoscopic images based on the principle of binocular disparity recognize that images providing a new and strange sense are present while viewing unfamiliar images glimmering in front of the eyes, and understand those images to be 3D stereoscopic images. However, consumers realize that this technology makes it impossible to view images for a long period of time due to the above-described fundamental limitations (CA conflict problem), and this impossibility becomes a principal factor that is an obstacle to the popularization of 3D image technology. Therefore, a new idea of an optimization method for solving this problem is required.

In order to naturally support direct interaction in a near-body space for a long period of time, principal parameters for an optical module design to represent binocular stereoscopic images corresponding to the range of a distance of the near-body space are separately present. In the past, a visualization optical module was arbitrarily designed and produced at any position depending on the condition of a manufacturer (for example, guidance for the purpose of product advertising, or guidance for allowing a viewer to view a TV while keeping a typical safe viewing distance of 2 to 3 m or longer) without having to know a specific value. Therefore, criteria for a conventional optical module design are unsuitable for 3D User Interface (UI)/User Experience (UX) conditions requiring direct interaction in the near-body space. In other words, expectation for the utilization of a wearable display presenting an individual-centered 3D stereoscopic visualization space is very high, but there are problems in that interaction in the near-body space, which was realized via the wearable display, was unnatural.

The present applicant has developed virtual/augmented/mixed reality content for a near-body space by utilizing a plurality of existing commercial HMD and FMD, but he or she has undergone difficulty in realizing a natural 3D effect and has obtained an idea of the present invention while conducting research.

As related preceding technology, Korean Patent Application Publication No. 10-2008-0010502 (entitled "Face-mounted display device for mixed reality environment") discloses technology for matching pieces of image information generated from an actual image and a plurality of artificial images with a single 3D virtual space, and transferring matched information to a user.

The invention disclosed in Korean Patent Application Publication No. 10-2008-0010502 presents a structure capable of combining an external image with information stored in an internal imaging device via a see-through function, and then solves conventional disadvantages occurring when a user independently uses the imaging device.

However, the invention disclosed in the above-described Korean Patent Application Publication No. 10-2008-0010502 merely presents a basic design and a simple application for combining and presenting multiple stereoscopic images on an eyeglass display (EGD) for an Expanded 3D (E3D) platform.

SUMMARY OF THE INVENTION

Accordingly, the present invention has been made keeping in mind the above problems occurring in the prior art, and an object of the present invention is to provide an apparatus and method for designing a display for user interaction, which allow direct interaction in a near-body space to be visually, naturally represented, so that a sense of unfamiliarity in interaction in a 3D space is not present, and which prevents the effect of negative human factors from occurring even if the display is used for a long period of time.

In accordance with an aspect of the present invention to accomplish the above object, there is provided an apparatus for designing a display for user interaction, including an input unit for receiving physical information of a user and a condition depending on a working environment; a space selection unit for selecting an optimal near-body work space corresponding to the condition received by the input unit; a space search unit for calculating an overlapping area between a viewing frustum space, defined by a relationship between a gaze of the user and an optical system of a display enabling a three-dimensional (3D) image to be displayed, and the optimal near-body work space selected by the space selection unit; a location selection unit for selecting a location of a virtual screen based on results of calculation by the space search unit; and an optical system production unit for producing an optical system in which the virtual screen is located at the location selected by the location selection unit.

Preferably, the space selection unit may map spatial data having a shape of a 3D volume to a work space depending on a body of the user, based on a value output via searching of pre-stored information, and select the mapped work space as the optimal near-body work space.

Preferably, the space search unit may form the viewing frustum space, and calculate an overlapping area by arranging the optimal near-body work space and the viewing frustum space to overlap each other.

Preferably, the location selection unit may enable the virtual screen to be formed at a location at which a viewing distance from eyes of the user to the virtual screen is 40 cm to 50 cm.

Preferably, the optical system production unit may incorporate a value of a parameter indicative of a distance from the user's pupil to the virtual screen into values obtained via the space selection unit, the space search unit, and the location selection unit.

Preferably, the optical system production unit may produce an optical system so that a 3D User Interface (UI) menu is displayed in a space defined by a length of 10 cm in an approaching direction and a length of 20 cm in a receding direction with respect to a viewing distance of 40 cm to 50 cm from the eyes of the user to the virtual screen.

Preferably, the apparatus may further include a correction unit for correcting image blurring and image distortion occurring in the display that enables the 3D image to be displayed and that includes the optical system produced by the optical system production unit.

Preferably, the correction unit may inwardly rotate an optical system module of the display enabling the 3D image to be displayed at a predetermined angle.

Preferably, the optical system module may include a user sight correction module.

Preferably, the correction unit may inwardly rotate an optical system module of the display enabling the 3D image to be displayed at a predetermined angle, and rotates an image output module in a direction opposite to a rotating direction of the optical system module.

In accordance with another aspect of the present invention to accomplish the above object, there is provided a method for designing a display for user interaction, including receiving, by an input unit, physical information of a user and a condition depending on a working environment; selecting, by a space selection unit, an optimal near-body work space corresponding to the received condition; calculating, by a space search unit, an overlapping area between a viewing frustum space, defined by a relationship between a gaze of the user and an optical system of a display enabling a three-dimensional (3D) image to be displayed, and the optimal near-body work space selected at selecting the optimal near-body work space; selecting, by a location selection unit, a location of a virtual screen based on results of calculation at calculating the overlapping area; and producing, by an optical system production unit, an optical system in which the virtual screen is located at the location selected at selecting the location.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
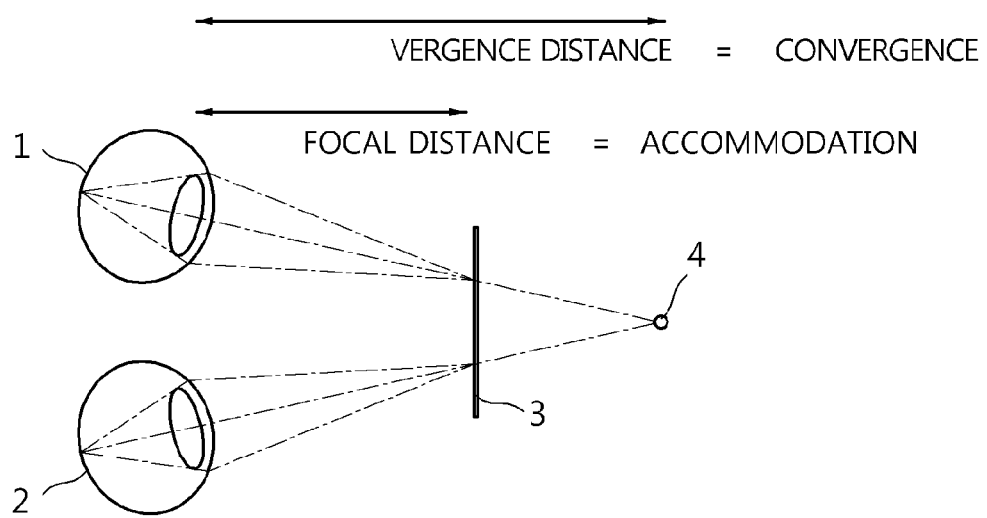
FIG. 1 is a diagram showing a convergence-accommodation conflict (CA conflict)
Figure 2:
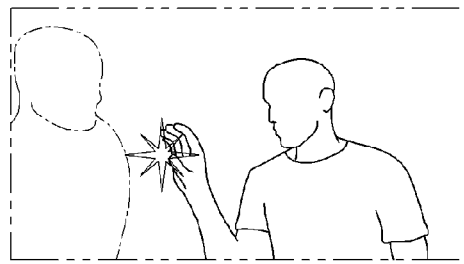
FIGS. 2A to 2D are diagrams showing examples in which interaction is conducted via a conventional 3D UI.
Figure 2:
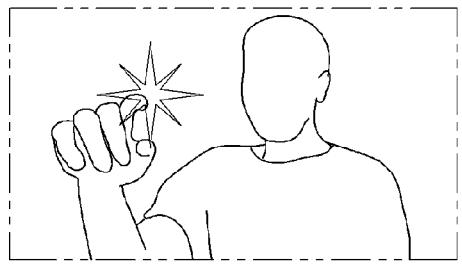
Figure 2:
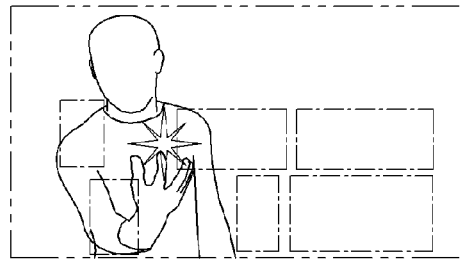
Figure 2:
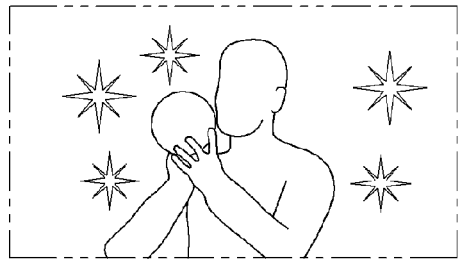

The present invention is intended to, if given problems are generalized depending on purposes, propose schemes for solving a problem for a utilization method which can analyze the limitations of binocular disparity-based 3D stereoscopic image visualization technology and obtain optimal effects, and a problem for searching for a method of utilizing base technology which can generalize variables for respective users related to the recognition of 3D stereoscopic images and present satisfaction of a predetermined level or more for stereoscopic images.

Hereinafter, an apparatus and method for designing a display for user interaction according to embodiments of the present invention will be described in detail with reference to the attached drawings. Prior to the following detailed description of the present invention, it should be noted that the terms and words used in the specification and the claims should not be construed as being limited to ordinary meanings or dictionary definitions. Meanwhile, the embodiments described in the specification and the configurations illustrated in the drawings are merely examples and do not exhaustively present the technical spirit of the present invention. Accordingly, it should be appreciated that there may be various equivalents and modifications that can replace the embodiments and the configurations at the time at which the present application is filed.

Figure 3:
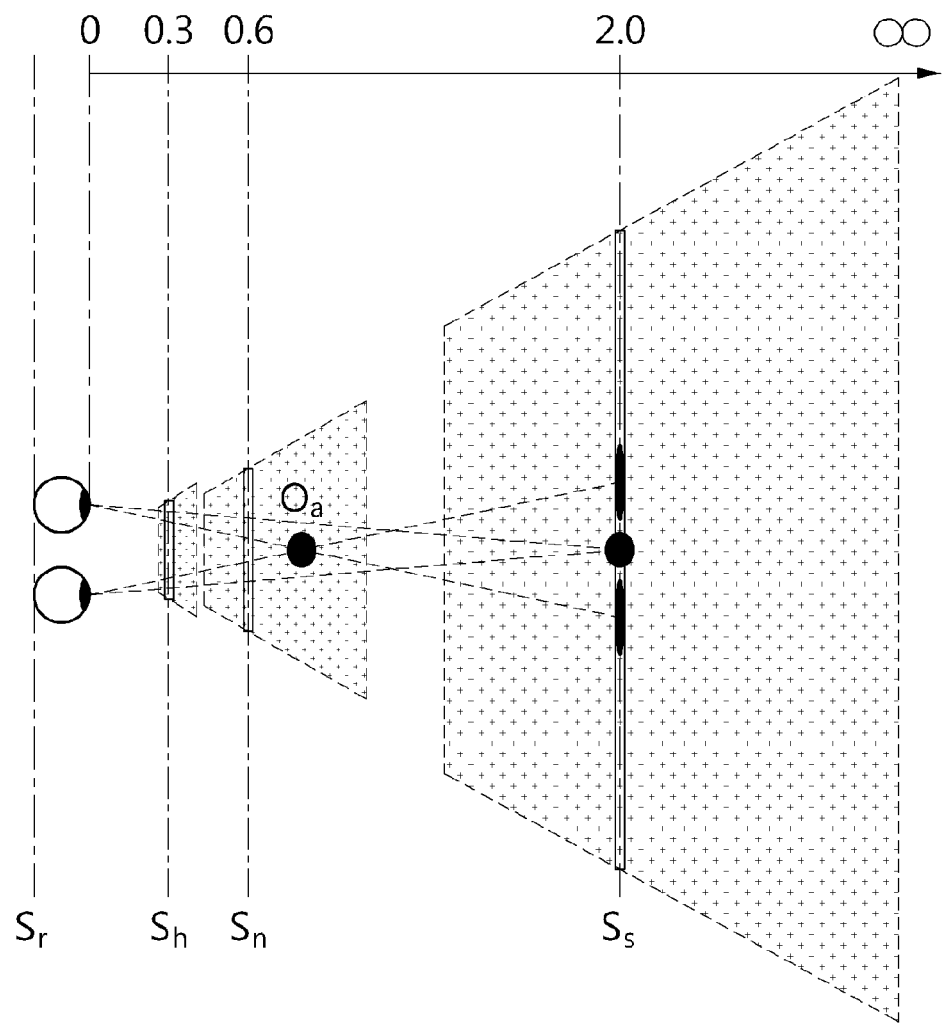
FIG. 3 is a diagram showing a basic idea becoming a motive for presenting the present invention.

FIG. 3 is a diagram showing a basic idea becoming a motive for presenting the present invention, which shows the limitations of a binocular disparity-type 3D stereoscopic display device that is currently universally utilized.

That is, it is only theoretically possible to produce a 3D image effect as if an image is located in front of (positive) or behind (negative) a screen located at a predetermined distance by using a method of outputting left/right images having various pieces of disparity information via the screen. For example, when a 3D stereoscopic image is visualized in a place where binocular disparity information is not 0 (zero)(the surface of the screen), a CA-disparity problem occurs. In this way, when a 3D stereoscopic image deviates from a range which can be accommodated by human beings, side effects occur.

Therefore, finite spaces for providing the representation of the natural sense of distance to a user may be defined as trapezoidal spaces respectively dependent on the screens $S_h$, $S_n$, and $S_s$ of FIG. 3 (in a 3D space, view frustum-shaped spaces defined between the user's gaze and a screen).

In FIG. 3, spaces in which a sense of 3D depth may be naturally represented to the user based on relationships between the locations of respective displays located at a distance of about 0.3 m, 0.6 m, and 2.0 m (that is, screens $S_h$, $S_n$, and $S_s$) and the location of the user's eyes are represented by trapezoidal spaces (finite spaces).

In order to represent an object $O_a$, it can be seen that a more comfortable 3D stereoscopic image may be transferred to the user by utilizing a method of displaying images using positive parallax on the screen $s_n$ rather than a method of displaying images using negative parallax on the screen $S_s$.

Figure 4:
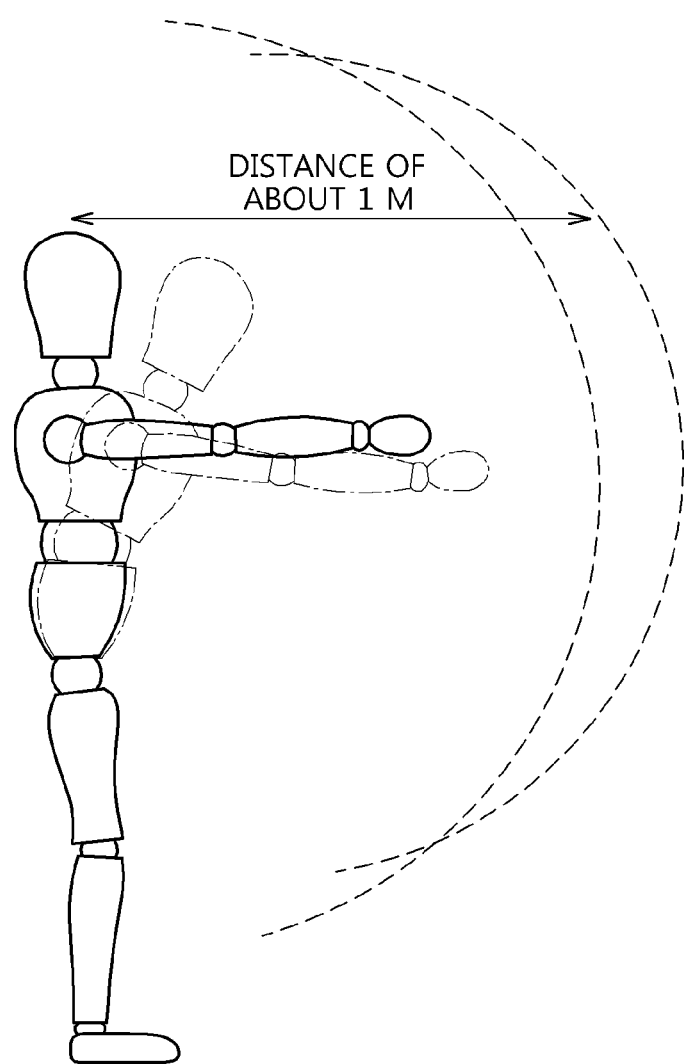
FIG. 4 is a diagram showing a near-body space to which an embodiment of the present invention is applied.

FIG. 4 is a diagram showing a near-body space to which an embodiment of the present invention is applied, wherein a distance reachable by the user (a distance of about 1 m) using only the motion of a body (for example, the motion of a waste and shoulders) without moving his or her location is designated as a near-body space. That is, as shown in FIGS. 2A to 2D, the near-body space denotes a space in which a 3D user interface is naturally visualized in a space around the use's body that is close enough to allow the user to directly touch the space.

Figure 5:
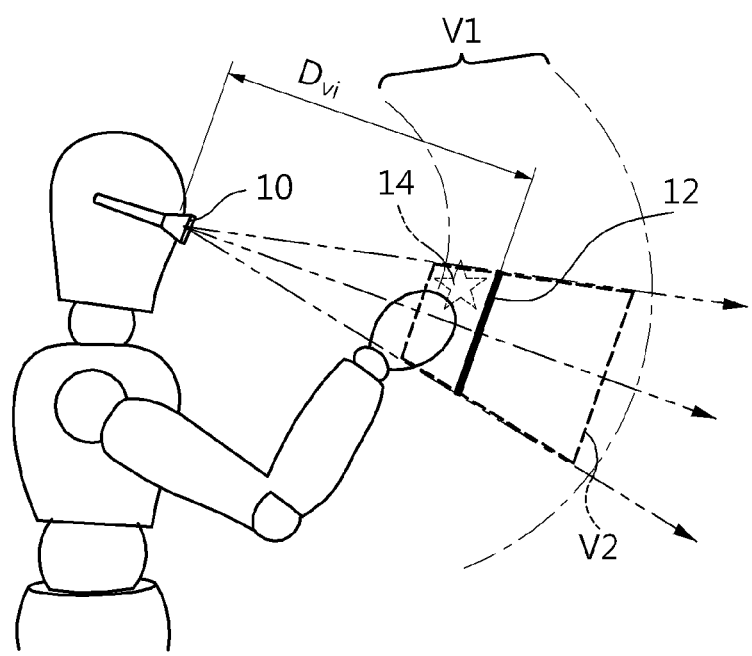
FIG. 5 is a diagram showing the definition of a space suitable for the representation of a virtual object when 3D UI/UX is implemented in a near-body space according to an embodiment of the present invention.

FIG. 5 is a diagram showing the definition of a space suitable for the representation of a virtual object when 3D User Interface/User Experience (UI/UX) is implemented in the near-body space. A comfortable user space (comfortable UI/UX volume) V1 is located within the near-body space.

The comfortable UI/UX volume V1 of FIG. 5, which is an example of a space defined based on human engineering technology, becomes a comfortably usable space if it is selected via a usability test depending on the touchable range of the user's body and then UI/UX is represented.

When an EGD 10 which is a representative interface device for implementing individual-centered UI/UX is implemented, it is preferable to locate the virtual screen 12, on which a virtual image for a 3D stereoscopic image is displayed, within the comfortable UI/UX volume V1. Further, optimized parameters must be reflected in the design and the optical system of the EGD 10 must be produced so that a comfort zone V2 for 3D stereoscopic visualization formed based on the virtual screen 12 is located within the comfortable UI/UX volume V1. That is, the location of the comfort zone V2 is applied to the parameter of the focal distance to have a distance value $D_{vi}$ to the virtual screen 12. The comfort zone V2 may be regarded as a region in which negative and positive 3D effects are comfortably represented.

Figure 6:
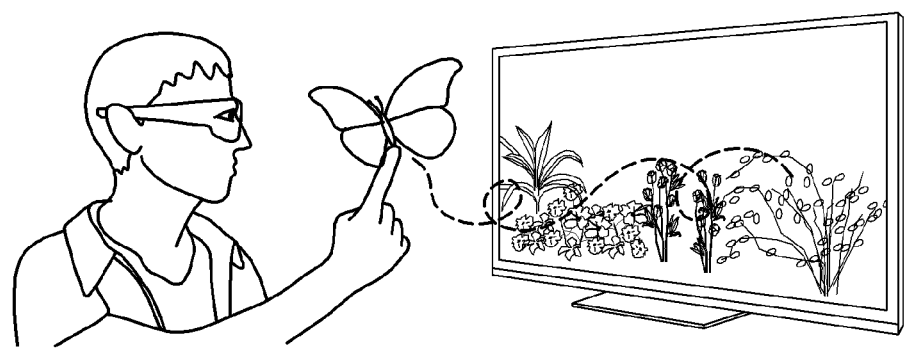
FIG. 6 is a diagram employed in the description of FIG. 5.

In this way, the user who points at a virtual 3D object (for example, a star) 14 in FIG. 5 may obtain a sensation of manipulating a 3D object in the near-body space, as shown in FIG. 6.

Figure 7:
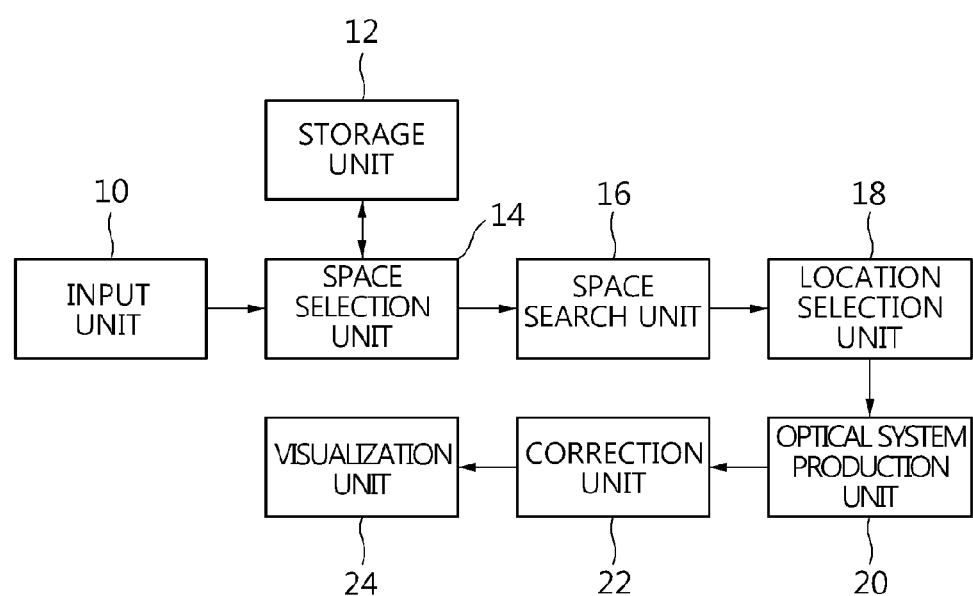
FIG. 7 is a diagram showing the configuration of an apparatus for designing a display for user interaction according to an embodiment of the present invention.

FIG. 7 is a configuration diagram of an apparatus for designing a display for user interaction according to an embodiment of the present invention.

The apparatus for designing a display for user interaction according to the embodiment of the present invention includes an input unit 10, a storage unit 12, a space selection unit 14, a space search unit 16, a location selection unit 18, an optical system production unit 20, a correction unit 22, and a visualization unit 24.

The input unit 10 receives the physical information of a user, a specific condition depending on a working environment, etc. For example, the input unit 10 receives information about the nationality, gender, age, and representative body size (for example, height, arm length, etc.) of the user so as to determine the physical attributes of the user who uses the Eye Glasses Display (EGD). Further, the input unit 10 receives a specific condition depending on the working environment (for example, a condition enabling a 3D UI to be arranged in a space in which only a portion, which the right hand of the upper body of the user touches, is utilized).

The storage unit 12 stores data about 2D and 3D spaces suitable for the arrangement of a user interface with respect to various physical conditions and working environments (including an object of work) defined in the field of research into human engineering. For example, since there are research data and production guidelines for UI arrangement in 2D and 3D spaces to optimize the working efficiency of human beings with respect to a dashboard or an airplane cockpit, in a special situation, in the research into the fields of human engineering, Human Computer Interface (HCI), and Human Machine Interface (HMI), such research data and guidelines may be collected and stored in the storage unit 12. In other words, it is possible to collect pieces of data published in academic research papers in relation to a task tool arrangement method for maximizing the work efficiency and stability of workers in an industrial site, a 3D arrangement method for a control interface and a control dashboard to perform the optimal task of airplane pilots, and a method of determining a location at which 3D GUI information is to be displayed in consideration of a user's mobility in a mobile environment, and store the collected data in the storage unit 12. Here, the storage unit 12 may also be referred to as a database (DB).

The space selection unit 14 searches the storage unit 12 based on the user information received by the input unit 10 and then selects an optimal near-body work space corresponding to the input condition. In other words, the space selection unit 14 connects/locates/maps spatial data having the shape of an arbitrary 3D volume to a work space depending on the body of the user, based on a value output by searching the storage unit 12. Further, the space selection unit 14 selects the mapped work space as an optimal near-body work space. Meanwhile, the space selection unit 14 is configured to, when a difference value is present between the physical information (for example, height, arm length, etc.) of the spatial data in the storage unit 12 and the actual physical size of the user who is a current application target, apply a scale up/scale down step depending on the corresponding ratio to the physical information.

In FIG. 7, although the storage unit 12 and the space selection unit 14 are shown as separate components, the storage unit 12 may be included in the space selection unit 14.

The space search unit 16 calculates an overlapping area (intersection) between a viewing frustum space having the shape of a truncated pyramid, which is defined by a relationship between the user's gaze and the optical system of the EGD, and the optimal near-body work space selected by the space selection unit 14. In other words, the space search unit 16 forms the viewing frustum space having the shape of a truncated pyramid, defined by the relationship between the user's gaze and the optical system of the EGD, and then arranges the optimal near-body work space selected by the space selection unit 14 to overlap the viewing frustum space. Thereafter, the space search unit 16 calculates (searches for) the overlapping area between the spaces. In this regard, an algorithm for obtaining a 3D volume intersection in a situation in which two spaces having arbitrary shapes and volumes overlap each other is technology introduced in major books such as "Graphics Gems by James Arvo" in the field of CAD and computer graphics, and thus a detailed description thereof is omitted.

The location selection unit 18 selects the location of a virtual screen based on the results obtained by the space search unit 16. In this case, the location selection unit 18 forms the virtual screen at a location where a viewing distance from the user's eyes to the virtual screen is about 43 cm. In this way, if an optical system in which the virtual screen is formed at the location where the viewing distance to the virtual screen is about 43 cm is designed, a 3D UI/UX visualization space in a maximally stable near-body space under the given condition may be obtained.

The optical system production unit 20 produces the optical system so that a virtual image is focused on the location selected by the location selection unit 18 (that is, the location present in a safe visualization area). That is, the optical system production unit 20 incorporates the value of the parameter indicating the distance from the pupil of the user to the virtual screen into values obtained via the space selection unit 14, the space search unit 16, and the location selection unit 18. For example, the optical system production unit 20 produces an optical system so that a 3D UI menu is displayed in a space having a length of about 10 cm in an approaching (near) direction and a length of about 20 cm in a receding (far) direction with respect to the above-described 43 cm location (that is, the safe visualization area having a thickness of about 30 cm in a depth direction with respect to the distance of 43 cm). In this way, a wearable display (for example, EGD) for providing an optimal 3D stereoscopic image to the user in a given environment may be produced, and the user may naturally observe the display 3D UI menu and comfortably interact with the wearable display.

The correction unit 22 corrects image blurring, image distortion, etc. in the wearable display (for example, EGD) including the optical system produced by the optical system production unit 20. For example, in order for the user to experience a natural stereoscopic image, the correction unit 22 inwardly rotates only optical system modules at an angle of θ, makes image output modules parallel with the virtual screen, and renders the image using an off-axis projection technique.

The visualization unit 24 visualizes a target object for interaction in the safe visualization area including the location of the virtual screen selected by the location selection unit 18 as a 3D stereoscopic image.

Figure 8:
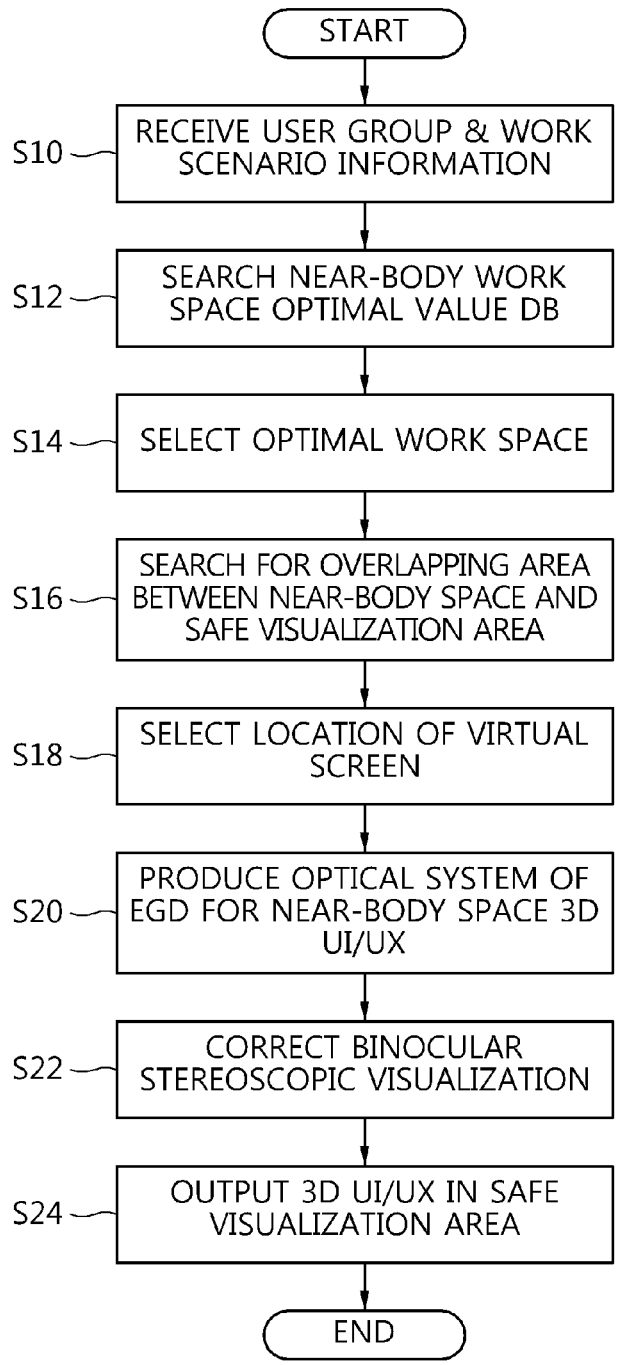
FIG. 8 is a flowchart showing a method for designing a display for user interaction according to an embodiment of the present invention.
Figure 9:
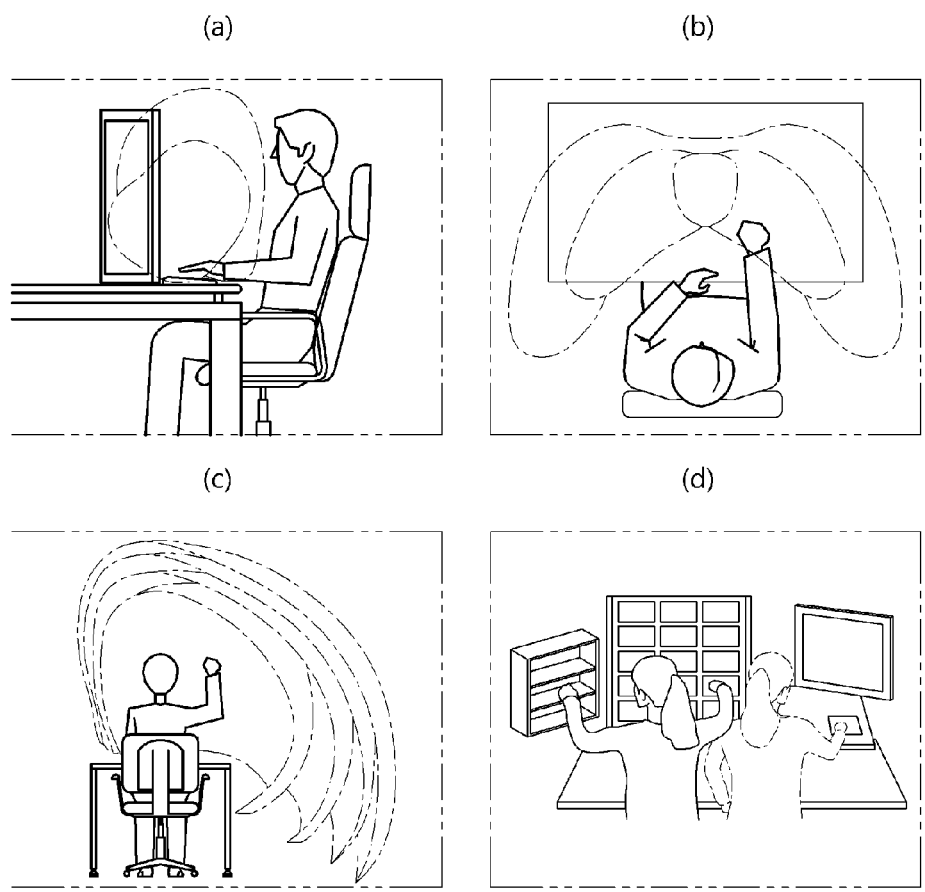
FIGS. 9 to 19 are diagrams employed in the description of FIG. 8.

FIG. 8 is a flowchart showing a method for designing a display for user interaction according to an embodiment of the present invention, and FIGS. 9 to 19 are diagrams employed in the description of FIG. 8.

First, at step S10, in order to determine the physical attributes of a user who uses a wearable display (for example, an EGD) enabling a 3D stereoscopic image to be displayed, the input unit 10 receives information about the nationality, gender, age, and representative body size (for example, height, arm length, etc.) of the user, and a specific condition depending on a working environment (for example, a condition enabling a 3D UI to be arranged in a space in which only a portion, which the right hand of the upper body of the user touches, is utilized).

Then, at step S12, the space selection unit 14 searches the storage unit 12 based on the user information input by the input unit 10.

At step S14, the space selection unit 14 selects an optimal near-body work space corresponding to the input condition from the results of the search in the storage unit 12. Here, the selection of the optimal near-body work space may be performed within a range enabling interaction to be conducted using a 3D action in the near-body space around the user, as illustrated in FIGS. 9A to 9D. Further, the optimal near-body work space may be a space formed by constructing a working environment interface in consideration of usability (task performance, safety, etc.) by means of human engineering experiments. In particular, the space selection unit 14 connects/locates/maps spatial data having the shape of an arbitrary 3D volume to a work space depending on the body of the user, based on the value output by searching the storage unit 12. In this case, when a difference value is present between the physical information (for example, height, arm length, etc.) of the spatial data in the storage unit 12 and the actual physical size of the user who is a current application target, a scale up/scale down step depending on the corresponding ratio is applied to the physical information.

Figure 10:
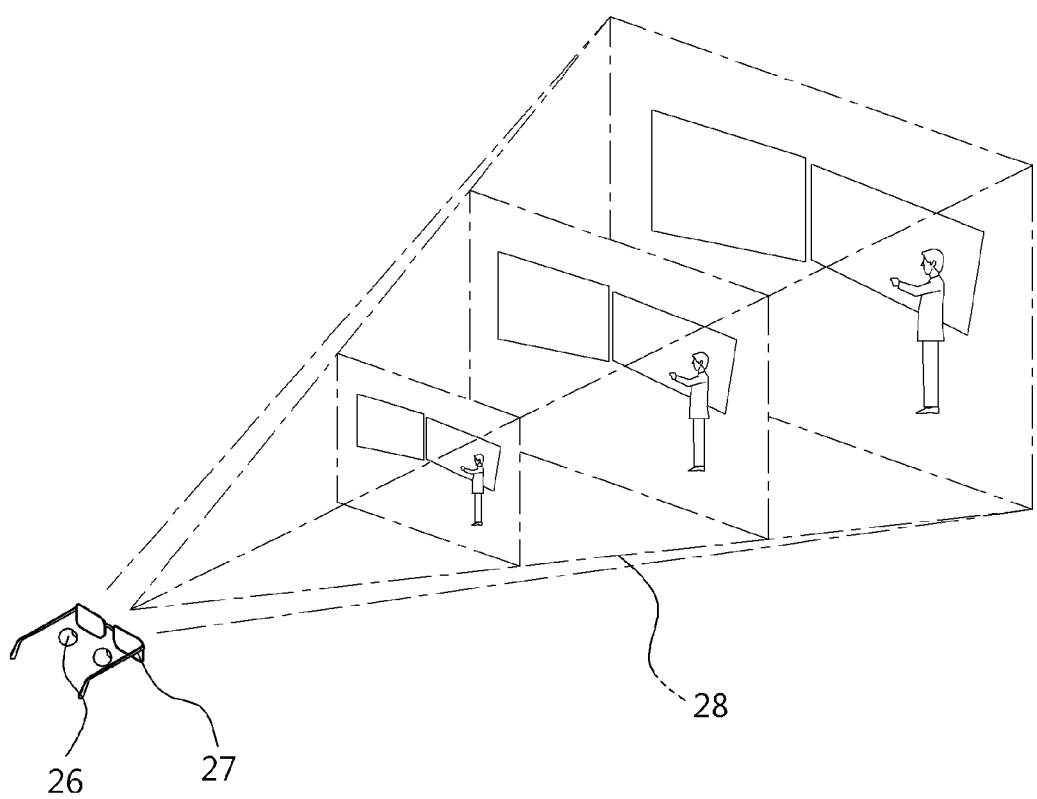
Figure 11:
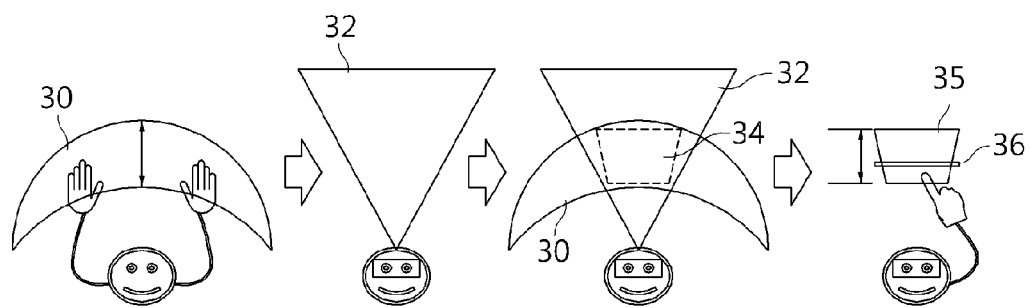

Further, at step S16, as shown in FIG. 10, the space search unit 16 calculates an overlapping area (intersection) between a viewing frustum space 28 having the shape of a truncated pyramid, which is defined by a relationship between the user's gaze 26 and the optical system of a wearable display (for example, EGD) 27, and the optimal near-body work space selected by the space selection unit 14.

Figure 12:
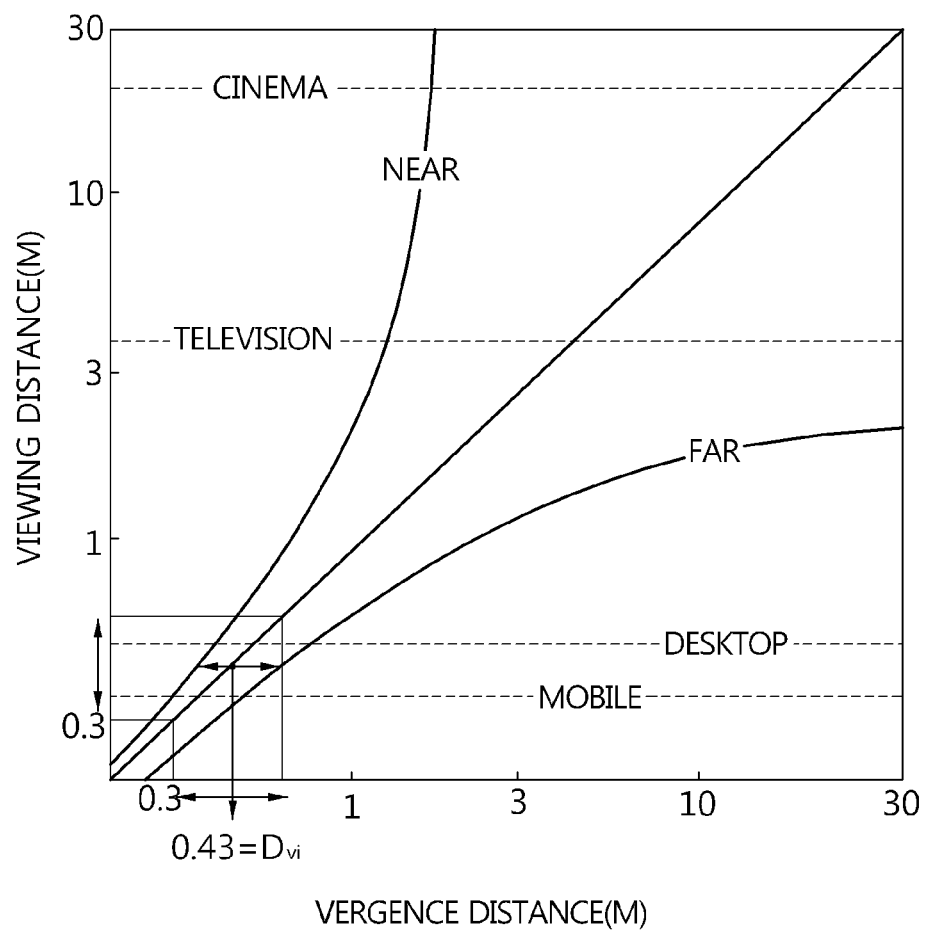

Thereafter, at step S18, the location selection unit 18 selects the location of the virtual screen based on the results of the space search unit 16. In order to describe a procedure for selecting the location of the virtual screen, if the overall process including procedures corresponding to the previous steps is rearranged, FIG. 11 may be depicted. An optimal near-body work space 30 represented suitably for a target user and a work scenario is selected (as a representative example, the work space is assumed to be a space located at a distance of 30 cm to 60 cm from the user's eyes). If a viewing frustum 32, on which 3D graphics can be visualized when the user wears the EGD, intersects the optimal near-body work space 30, a common space 34 may be obtained. If, for the space 34 defined in this way, the spatial range from a location near to the user to a location far from the user is calculated, a frustum 35 falling within a range of about 35 cm to 60 cm may be obtained. That is, as indicated by arrows in a graph illustrated in FIG. 12 (this is a graph obtained via experiments on 3D space recognition characteristics of a human being in human engineering and 3D stereoscopic image visualization, and obtained by approximately representing the range of a visualization area so that the human being can comfortably feel a 3D effect, see paper: http://spie.org/x93650.xml), the frustum 35 falling within the range of about 35 cm to 60 cm may be obtained. Therefore, if an optical system is designed such that a virtual screen 36 is formed at a location defined by an area having the maximal length in a depth direction (distance between near and far locations) in the frustum 35 (safe visualization area), for example, at a location having a viewing distance of about 40 cm to 50 cm (preferably, about 43 cm), a 3D UI/UX visualization space in a maximally stable near-body space under the given condition may be obtained. In other words, FIG. 12 is a graph showing limit values of suitable 3D stereoscopic image spaces (near and far limit values; negative/positive parallax) that can be represented on respective displays depending on the distances between the user and the displays in an environment in which various displays are used. In the present invention, in order to locate the virtual screen on a place where a maximum work space size (volume) is obtained in the near-body space, the space of the graph is searched. Further, in the present invention, there is a tendency that, among the 3D effect recognition characteristics of a human being based on binocular disparity, positive parallax is more comfortable for the user than negative parallax, and thus the location (that is, 43 cm) enabling a width of a maximum of about 30 cm to be secured based on the depth space is selected in consideration of such a tendency.

Figure 13:
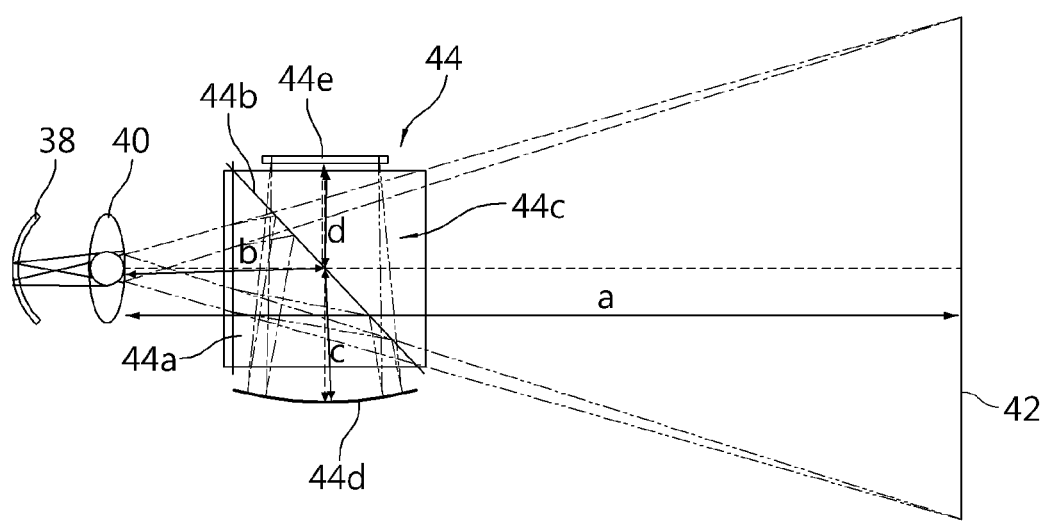

Thereafter, at step S20, the optical system production unit 20 produces an optical system so that a virtual image is focused on the location selected by the location selection unit 18 (that is, so that the virtual screen is located). For example, at the step S20 of producing the EGD optical system for the near-body space 3D UI/UX, if the monocular optic module of the EGD is produced so that a virtual image is focused on a location of about 43 cm from the user's eyes, the user may naturally observe a 3D UI menu displayed in a space defined by a length of about 10 cm in an approaching (near) direction and a length of about 20 cm in a receding (far) direction with respect to the location of 43 cm and comfortably interact with the 3D UI menu, as shown in FIG. 12. FIG. 13 illustrates an example in which, when an optical see-through-type EGD is designed, a $D_{vi}$ parameter derived in the above procedure is applied. In FIG. 13, $D_{vi}$=a(=0.43 m), where a denotes a parameter indicative of a distance from a pupil 40 to a virtual screen 42. In this way, if the value of the parameter 'a' indicative of the distance from the pupil 40 to the virtual screen 42 is incorporated into the values obtained via the above-described steps, the EGD for providing an optimal 3D stereoscopic image to the user in a given environment may be produced. In FIG. 13, reference numeral 38, not described, denotes the retina, and 44 denotes the optical module of the EGD desired to be produced (also referred to as an "optical system"). Here, the optical module 44 may include prisms 44a and 44c for refracting light, a beam splitter (translucent mirror) 44b for reflecting or transmitting light, a concave reflective mirror 44d, and a display panel 44e for displaying a real image. In FIG. 13, b denotes a distance from the pupil to the plane of the beam splitter 44b, c denotes a distance from the plane of the beam splitter 44b to the concave reflective mirror 44d, and d denotes a distance from the plane of the beam splitter 44b to the display panel 44e.

Figure 14:
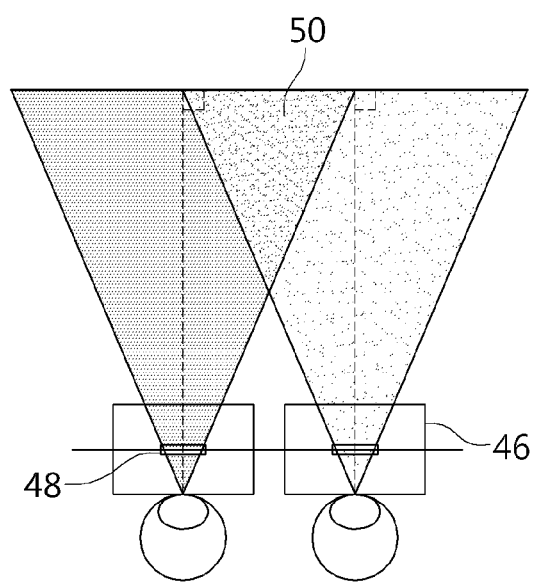

Then, at step S22, the correction unit 22 corrects binocular stereoscopic visualization. At the binocular stereoscopic visualization correction step, when the EGD is produced to visualize the near-body space, a convergence element is reflected to consider the natural visual recognition characteristics of a human being. That is, a situation in which optical system modules 46 for generating left and right images are simply arranged in parallel, as shown in FIG. 14, is similar to a case where an observation target (for example, the virtual screen) is spaced at an infinite distance from the standpoint of convergence. Further, in this case, a space in which left and right images simultaneously overlap each other upon representing the near-body space is reduced to about 50%, and thus an area in which a sense of 3D distance may be naturally represented (that is, the 3D visualization space 50) is reduced. In FIG. 14, reference numeral 48, not described, denotes image output modules included in the optical system modules 46 and configured to output left/right images.

Figure 15:
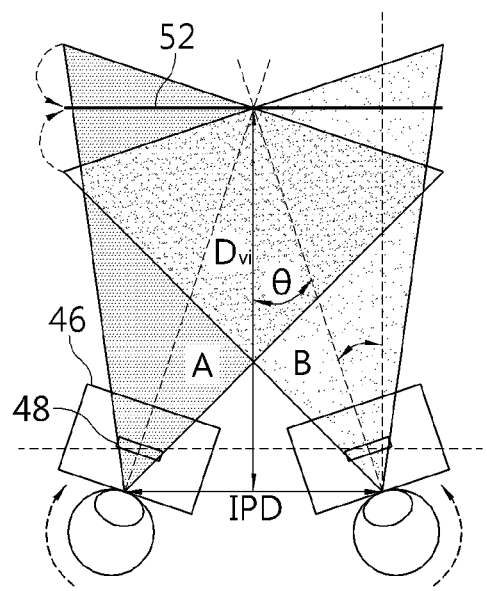

However, in order to implement the 3D UI/UX in the near-body space, the $D_{vi}$ parameter (for example, about 43 cm) has been determined via the above-described procedure. Therefore, in order to reflect the natural visual recognition operation of a human being, as shown in FIG. 15, the optical system modules 46 and the image output modules 48 are rotated inwardly at an angle of θ reflecting convergence, and rendering is performed using an on-axis projection technique based on bilateral symmetry in which the central axis of the gaze (view direction vector) vertically intersects a virtual screen 52. Here, the on-axis projection technique may be regarded as a basic computer graphics algorithm that may be easily understood by those skilled in the art from well-known technology.

In FIG. 15, $$\theta = \tan^{-1}\left(\frac{IPD}{2 \times D_{vi}}\right)$$

may be represented. In Equation, IPD denotes an inter-pupil distance between two eyes indicative of the physical attributes of the user, and $D_{vi}$ denotes a distance from the center of the IPD between two eyes indicative of the physical attributes of the user to the virtual screen.

The method shown in FIG. 15 is a method of reflecting the attributes of a human organ of sight without change when a visual object in the near-body space located at a predetermined distance is visualized. However, when a 3D stereoscopic image is generated based on binocular disparity information, an additional correction procedure must be applied so as to exactly represent a difference between left and right images on the virtual screen 52. In other words, as shown in FIG. 15, when each optical system module 46 and each image output module 48 are rotated using a method corresponding to human convergence, the information of spaces "A" and "B" in FIG. 15 physically has a projection error with respect to the virtual screen 52 assumed to be spaced apart from the user's eyes by a predetermined distance. Accordingly, as the information in "A" and "B" become far away from the center of the virtual screen 52, larger keystone distortion occurs. The keystone distortion occurs due to vertical aberration of the stereoscopic image when an image in "A" and an image in "B" are located on different planes due to a distortion. In this case, keystone distortion is similar to a phenomenon in which one side of the image in "A" is larger and the other side thereof is smaller than the image in "B" and then the tilting of images occurs. Therefore, a visualized image to which the rendering algorithm for correcting such keystone distortion is applied must be output.

Figure 16:
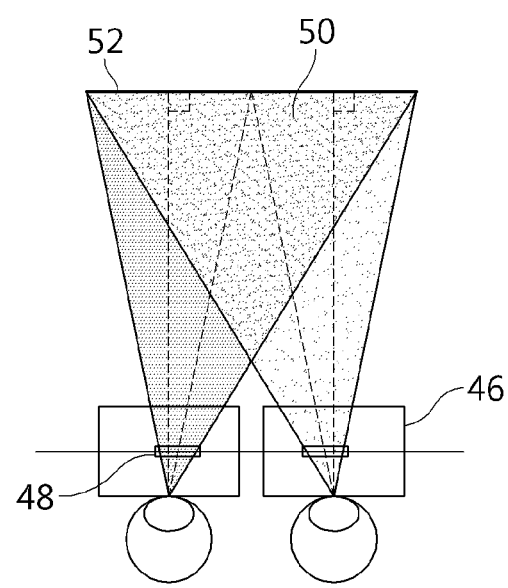

FIG. 16 is a method of compensating for disadvantages in FIGS. 14 and 15 and simplifying a design and production procedure. Since image output modules (for example, micro display panels 48 corresponding to 44e in FIG. 13) are horizontally shifted in an inward direction between two eyes, and locations at which view vectors of the user vertically intersect the image output modules 48 and the virtual screen 52 do not pass through their center points, images are rendered using an off-axis projection technique. Here, such an off-axis projection technique may be regarded as a basic computer graphics algorithm that may be easily understood by those skilled in the art from well-known technology. In FIG. 15, keystone distortion must be corrected. When keystone distortion is corrected, the image output modules 48 do not generate pixels that are not used in a final image, and there is a disadvantage in that actual resolution is decreased. Therefore, when the display is implemented as shown in FIG. 16, additional correction for keystone distortion is not required, and thus the problem of a decrease in resolution may be solved.

Figure 17:
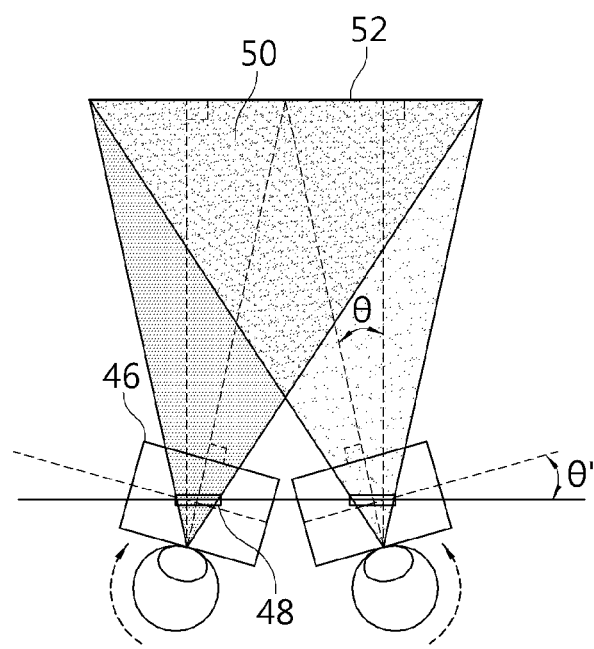

However, by means of the method shown in FIG. 16, when a 3D stereoscopic image is represented in a near-body space (for example, location at a distance of 43 cm in front of the eyes), the user experiences a reaction allowing his or her eyes to be naturally (unconsciously) concentrated on the center of the eyes. If this attribute is not actively coped with, side effects occur due to a CA conflict. Therefore, such side effects are corrected using a solution method, as shown in FIG. 17. As shown in FIG. 17, only the optical system modules 46 are inwardly rotated at an angle of θ, and the image output modules 48 are caused to be parallel with the virtual screen 52. Then, if rendering is performed using an off-axis projection technique and a 3D stereoscopic image is visualized, the user may experience a natural stereoscopic image. In this way, a method of tilting the central axis of the optical system modules 46 around an image generation plane is called a tilt-shift lens technique. In this case, actually, the image output modules 48 may be actually rotated at a predetermined angle in a direction opposite to the rotating direction of the optical system modules 48. When this method is applied, an image corresponding to an outer portion of a lens around the center portion of the lens has a different focal distance, and thus the image may slightly blur. However, when an inter-pupil distance (IPD) is assumed to be about 65 mm (65.5 mm at 75%, and most preferably, 63.15 mm) with reference to the statistical standard (global mean: about 62.62 mm) of the physical sizes of Korean adults at a short range (for example, about 43 cm) for visualization of the near-body space that is the target of the present invention, θ has a value of about 4.2°, and thus the actual blurring of images caused by the application of the tilt-shift lens technique does not greatly appear. Further, the effect of blurring at this time is relatively small, compared to blurring in an outer portion of an image appearing upon using an inverse distortion correction technique in rendering software (S/W) for correcting image distortion (lens distortion) appearing when a wide Field of View (FOV) is applied to the optical system modules 46. In other words, correction such as that shown in FIG. 17 is a method of solving the disadvantage of FIG. 15 by utilizing the advantage of FIG. 16 while accommodating the natural attributes of the organ of sight of a person when the person views the near-body space, as shown in FIG. 15. Therefore, when the correction such as that shown in FIG. 17 is performed, direct interaction is visually, naturally represented in the near-body space, thus removing a sense of unfamiliarity in interaction in a 3D space. Further, even if the wearable display (for example, EGD) is used for a long period of time, a negative human factor effect is not caused. In the above description of FIG. 17, the value of angle θ, at which the optical system modules 46 are rotated towards a center portion for the convergence of both eyes, and the value of angle θ' at which the image display modules 48 are rotated relatively with respect to the parallel axis of an optical module holding unit (not shown) for parallelism with the virtual screen 52, may have a difference of several degrees (for example, 1~2° (that is, θ≈θ') in consideration of a tolerance for physical optical characteristics and processing. As a result of the optimized design of the optical modules, θ was calculated as 4.2° and θ' was calculated as 5.4°.

Finally, at step S24, the visualization unit 24 outputs 3D UI/UX in the safe visualization area. That is, a target object for interaction is visualized as a 3D stereoscopic object in a safe visualization area 35 having a thickness of about 30 cm in a depth direction with respect to a distance of about 43 cm illustrated in FIG. 11. In this case, the visualization unit 24 may be regarded as including at least an image output module for visualization.

Above description made with reference to FIGS. 8 to 17 reflects certain preconditions based on a user and a working environment, which utilize a wearable display (EGD) for a fixed near-body space, and illustrates a method of producing an EGD device optimized to each case.

Figure 18:
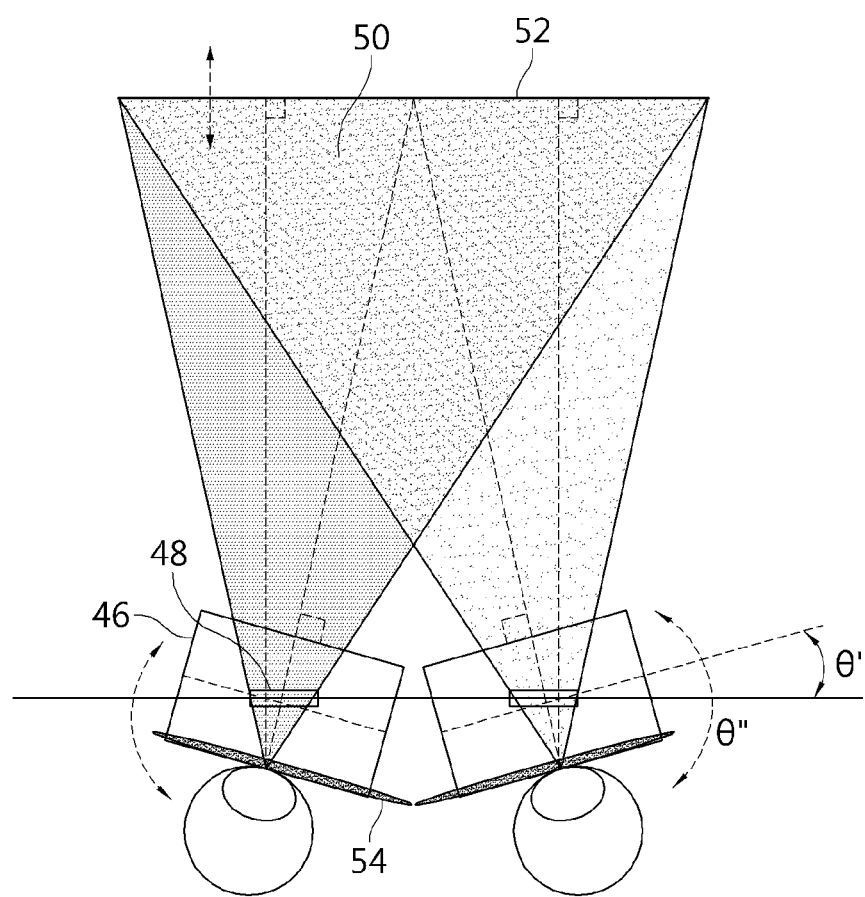

Meanwhile, FIG. 18 illustrates a method of producing and utilizing an EGD device which can cope with various work scenarios and various users by variously considering a distance to the virtual screen 52 and visual attributes (for example, sight, IPD, etc.) differing for respective users, among the above-described components of the EGD device. In order to support users having different sight conditions when the EGD is produced, if ocular lenses corresponding to various sight conditions (diopter) are additionally and detachably provided (for example, see Oculus RIFT HMD, http://www.oculusvr.com/, http://www.epo.org/learning-events/european-inventor/finalists/2013/berge/feature.html) or if liquid lenses (see http://newlaunches.com/archives/presbyopia_astronauts_at_nasa_get_superfocus_glasses.php, https://www.google.co.kr/search?q=liquid+lens&um=1&ie=UTF-8&hl=en&tbm=isch&source=og&sa=N&tab=wi&ei=9VUUUpvRCK6OiAe71ICYCg& biw=1117&bih=860&sei=91UUUpGMI4mgige704HgDA, http://opti-lux.com/technology) are added to the optical system modules 46 of the EGD, the EGD may cope with users having various sight conditions. That is, in FIG. 18, user sight correction modules 54 only need to be added to the optical system modules 46.

When there is a need to change the $D_{vi}$ parameter determined in the above description (description of FIG. 8), a mechanism (not shown) for controlling a distance value to the virtual screen 52 among parameters of the optical system modules 46 may be provided. That is, FIG. 18 shows an example in which an optical see-through optical system is composed of half-reflection mirror/prism/concave reflection mirror (lens), wherein if a value corresponding to Si(c+d) in a Gaussian lens formula (see http://graphics.stanford.edu/courses/cs178-13/applets/gaussian.html) is changed, distance 'a' to the virtual screen 52 may be changed. In this case, Si denotes Si presented in the referred Gaussian lens formula (image space distance), and a, c, and d are identical to those shown in FIG. 13.

In this way, once the distance to the virtual screen 52 is determined, a structure (for example, including a worn gear) for rotating the optical system modules 46 (at an angle of about θ") is provided so as to reflect convergence values formed by the user's two eyes under a natural observation condition. In this case, the image output modules 48 located in the optical system modules 46 are fixed in parallel with the virtual screen 52, and only the optical system modules 46 are rotated. Further, in order to cope with users having various IPDs, a horizontal interval adjustment unit (also referred to as an "IPD adjustment unit") is provided.

Figure 19:
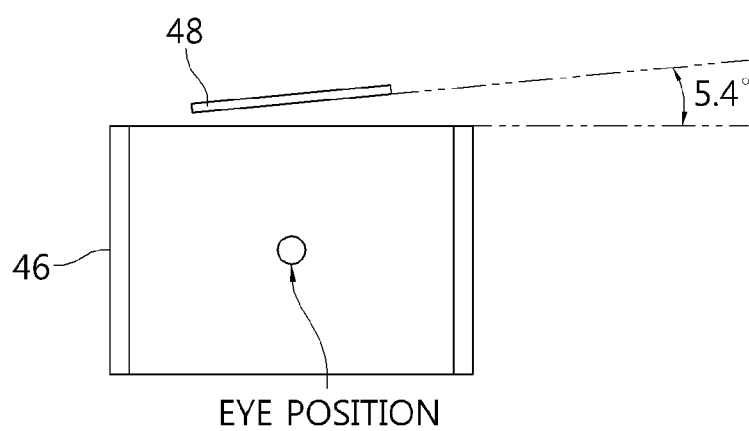

FIG. 19 is a diagram showing an optical system module 46 viewed from the location of a right eye in FIGS. 17 and 18, wherein an image output module 48 may be regarded as the display panel 44e of FIG. 13.

A tilt angle of the display panel relatively rotating with respect to the parallel axis of the optical module holding unit (not shown) so as to maintain the display panel in a state parallel with the virtual screen 52 is about 5.4°.

In other words, the image output module 48 of FIG. 19 is arranged in the direction of a view direction vector extending from the eye to the virtual screen, as in the case of the display panel 44e of FIG. 13. However, when the design of the reflective optical system of FIG. 13 is applied, a person feels with his or her eyes as if the image output modules are present in front of the eyes like the virtual screen, as shown in FIGS. 17 and 18. Further, in FIGS. 17 and 18, θ' denotes the rotation angle of the image output modules 48. In FIGS. 17 and 18, the image output modules 48 are actually rotated in a direction opposite to the rotation direction (θ or θ") of the optical system modules 46, and thus the user may feel with his or her eyes that the image output modules 48 are parallel with the virtual screen 52, as shown in FIGS. 17 and 18.

FIGS. 17 to 19 illustrates a structure for reversely rotating the image output modules 48 (display panels) in a direction opposite to the rotation direction of the optical system modules 46 without shifting the image output modules 48, thus enabling lengths extending from the center of each image output module 48 (display panel) to the left and right boundaries thereof to be varied by a rotation angle. Therefore, in a portion of the nose, an image projection distance increases, and in portions of the left and right borders, the image projection distance decreases, and thus the shift technique implemented in FIG. 16 may be similarly represented.

As described above, although the person feels with his or her eyes as if the image output modules 48 (display panels) are parallel with the virtual screen 52, shown in FIGS. 17 and 18, the image output modules 48 are actually rotated in a direction opposite to that of the optical system modules 46. Thus, when the optical system module 46 viewed from the right eye is caused to be horizontal, as shown in FIG. 19, the image output module 48 (display panel) is tilted so that the left portion thereof becomes lower than the right portion thereof. In the case of the optical system module viewed from the left eye, the image output module 48 (display panel) will be tilted so that the left portion thereof becomes higher than the right portion thereof.

The embodiments of the above-described present invention may be applied when various types of binocular disparity-based 3D display devices such as a wearable type and a stationary type realize natural stereoscopic images.

Further, in the above embodiments of the present invention, a procedure for determining a parameter $D_{vi}$ (distance to the virtual screen) and a procedure for correcting convergence may be simultaneously applied, or may be independently implemented by realizing separate functions, upon implementing a single EGD.

In accordance with the present invention having the above configuration, direct interaction is possible in a near-body space in such a way that a stereoscopic image object may be positioned or touched with a user's fingertip. When 3D UI/UX that was proposed only by synthesis of conceptual drawings or 3D images is realized based on a wearable interface device, a natural interactive space around a user may be actualized.

Upon outputting binocular stereoscopic images, when a 3D object for short-range interaction is represented in a near-body space, it is preferable to form a focal plane (virtual screen) within a range in which a user's hand can naturally reach the virtual screen (in a comfortable posture), and positive/negative (+/−) stereoscopic representation (CZ) is possible based on such a focal plane.

A user can naturally experience a sense of interacting with a 3D UI floating in the air as if he or she manipulates an object located at a long distance, in front of a 3D TV or a 3D screen.

Further, since a user can act while personally feeling the action of touching a virtual object in a 3D space like special effects in movies rather than directing such an action, an actor or the like may naturally act (for example, a natural posture of looking at an object and processing his or her gaze) in a virtual studio.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An apparatus for designing a display for user interaction, comprising:
    an input unit for receiving physical information of a user and a condition depending on a working environment;
    a space selection unit for selecting an optimal near-body work space corresponding to the condition received by the input unit and based on the physical information of the user, including an area in which the user is capable of interacting with a virtual screen near a body of the user in the working environment;
    a space search unit for calculating an overlapping area between a viewing frustum space, defined by a relationship between a gaze of the user and an optical system of a display enabling a three-dimensional (3D) image to be displayed, and the optimal near-body work space selected by the space selection unit;
    a location selection unit for selecting a location of the virtual screen based on results of calculation by the space search unit; and
    an optical system production unit for producing an optical system in which the virtual screen is located at the location selected by the location selection unit,
    wherein the optical system production unit incorporates a value of a parameter indicative of a distance from the user's pupil to the virtual screen into values obtained via the space selection unit, the space search unit, and the location selection unit,
    wherein the optical system production unit produces an optical system so that a 3D User Interface (UI) menu is displayed in a space defined by a length of 10 cm in an approaching direction and a length of 20 cm in a receding direction with respect to a viewing distance of 40 cm to 50 cm from the eyes of the user to the virtual screen.

2. The apparatus of claim 1, wherein the space selection unit maps spatial data having a shape of a 3D volume to a work space depending on a body of the user, based on a value output via searching of pre-stored information, and selects the mapped work space as the optimal near-body work space.

3. The apparatus of claim 1, wherein the space search unit forms the viewing frustum space, and calculates an overlapping area by arranging the optimal near-body work space and the viewing frustum space to overlap each other.

4. The apparatus of claim 1, wherein the location selection unit enables the virtual screen to be formed at a location at which a viewing distance from eyes of the user to the virtual screen is 40 cm to 50 cm.

5. A method for designing a display for user interaction, comprising:
    receiving, by an input unit, physical information of a user and a condition depending on a working environment;
    selecting, by a space selection unit, an optimal near-body work space corresponding to the received condition and based on the physical information of the user, including an area in which the user is capable of interacting with a virtual screen near a body of the user in the working environment;
    calculating, by a space search unit, an overlapping area between a viewing frustum space, defined by a relationship between a gaze of the user and an optical system of a display enabling a three-dimensional (3D) image to be displayed, and the optimal near-body work space selected at selecting the optimal near-body work space;
    selecting, by a location selection unit, a location of the virtual screen based on results of calculation at calculating the overlapping area; and
    producing, by an optical system production unit, an optical system in which the virtual screen is located at the location selected at selecting the location,
    wherein producing the optical system is configured to incorporate a value of a parameter indicative of a distance from the user's pupil to the virtual screen into values obtained via selecting the space, calculating the overlapping area, and selecting the location, and
    wherein producing the optical system is configured to produce an optical system so that a 3D User Interface (UI) menu is displayed in a space defined by a length of 10 cm in an approaching direction and a length of 20 cm in a receding direction with respect to a viewing distance of 40 cm to 50 cm from the eyes of the user to the virtual screen.

6. The method of claim 5, wherein selecting the space comprises:
   mapping spatial data having a shape of a 3D volume to a work space depending on a body of the user, based on a value output via searching of pre-stored information; and
   selecting the mapped work space as the optimal near-body work space.

7. The method of claim 5, wherein calculating the overlapping area comprises:
   forms the viewing frustum space; and
   calculating an overlapping area by arranging the optimal near-body work space and the viewing frustum space to overlap each other.

8. The method of claim 5, wherein selecting the location is configured to enable the virtual screen to be formed at a location at which a viewing distance from eyes of the user to the virtual screen is 40 cm to 50 cm.

9. The method of claim 5, further comprising correcting, by a correction unit, image blurring and image distortion occurring in the display that enables the 3D image to be displayed and that includes the optical system produced at producing the optical system.

10. The method of claim 9, wherein correcting is configured to inwardly rotate an optical system module of the display enabling the 3D image to be displayed at a predetermined angle.

11. The method of claim 9, wherein correcting is configured to inwardly rotate an optical system module of the display enabling the 3D image to be displayed at a predetermined angle, and rotate an image output module in a direction opposite to a rotating direction of the optical system module.

12. An apparatus for designing a display for user interaction, comprising:
   an input unit for receiving physical information of a user and a condition depending on a working environment;
   a space selection unit for selecting an optimal near-body work space corresponding to the condition received by the input unit and based on the physical information of the user, including an area in which the user is capable of interacting with a virtual screen near a body of the user in the working environment;
   a space search unit for calculating an overlapping area between a viewing frustum space, defined by a relationship between a gaze of the user and an optical system of a display enabling a three-dimensional (3D) image to be displayed, and the optimal near-body work space selected by the space selection unit;
   a location selection unit for selecting a location of the virtual screen based on results of calculation by the space search unit;
   an optical system production unit for producing an optical system in which the virtual screen is located at the location selected by the location selection unit; and
   a correction unit for correcting image blurring and image distortion occurring in the display that enables the 3D image to be displayed and that includes the optical system produced by the optical system production unit,
   wherein the correction unit inwardly rotates an optical system module of the display enabling the 3D image to be displayed at a predetermined angle, and rotates an image output module in a direction opposite to a rotating direction of the optical system module.

13. The apparatus of claim 12, wherein the optical system module comprises a user sight correction module.

* * * * *